Patented Dec. 5, 1922.

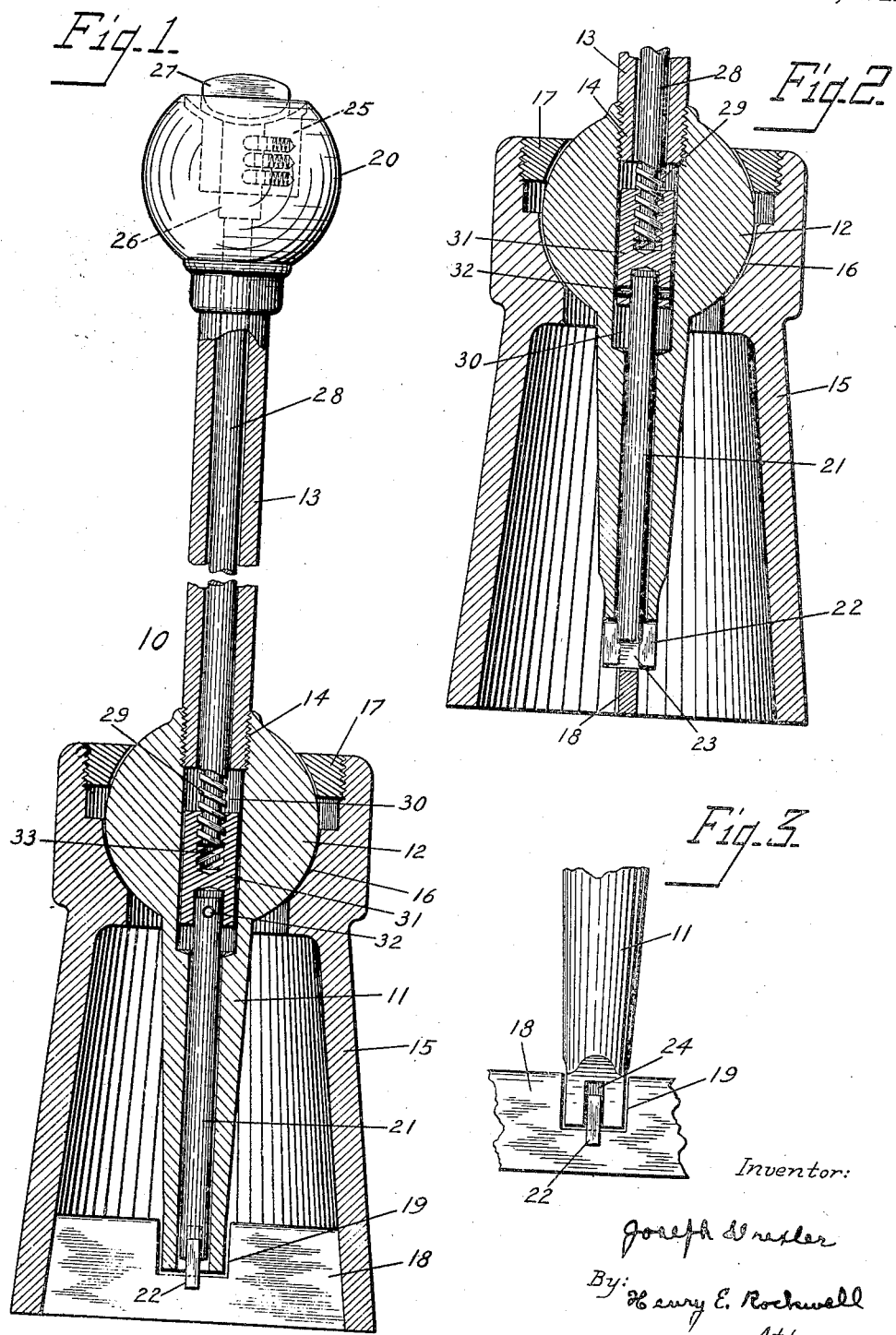

1,437,795

UNITED STATES PATENT OFFICE.

JOSEPH DREXLER, OF NEW HAVEN, CONNECTICUT, ASSIGNOR TO SARGENT & COMPANY, OF NEW HAVEN, CONNECTICUT, A CORPORATION OF CONNECTICUT.

LOCK FOR GEAR-SHIFT LEVERS AND THE LIKE.

Application filed December 19, 1919. Serial No. 345,964.

*To all whom it may concern:*

Be it known that I, JOSEPH DREXLER, of New Haven, county of New Haven, State of Connecticut, have invented certain new and useful Improvements in Locks for Gear-Shift Levers and the like, of which the following is a full, clear, and exact description.

This invention relates to locks and more particularly to means for locking an automobile gear shift lever to prevent unauthorized manipulation of the same.

The primary object of my invention is to provide a gear shift lever with key-controlled means for locking the same in its neutral position, and a more specific object of my invention is to provide the type of gear shift lever which is provided with a notched guide mounted adjacent the lower end thereof, with key-controlled means for locking the lever to this guide.

To this and other ends the invention consists in the novel features and combinations of parts to be hereinafter described and claimed.

In the accompanying drawing:

Fig. 1 is a vertical sectional view through a gear shift lever and its supporting bracket showing my invention applied thereto with the parts in their locked position.

Fig. 2 is a vertical sectional view through the lower half of the structure shown in Fig. 1, but taken at right angles to the section of Fig. 1 and showing the parts in their unlocked position; and Fig. 3 is a fragmentary side view of the lower portion of the gear shift lever shown in Fig. 1.

In the embodiment of my invention illustrated in the drawing, I have used the numeral 10 to designate the gear shift lever in its entirety and this lever is preferably constructed of a lower portion 11 provided with a spherical bearing member 12, and an upper tubular portion 13 having threaded engagement with the bearing member 12, as indicated at 14. The gear shift lever 10 is mounted in a supporting bracket 15 having a substantially spherical socket 16 in which the spherical bearing member 12 is rockingly mounted. The lever 10 is preferably retained properly seated in its bracket 15 by the threaded gland nut or collar 17, which has threaded engagement with the upper portion of the bracket 15. In the type of gear shift lever illustrated in the drawing, a guide plate 18 is commonly mounted in the lower portion of the casing 15 adjacent the lower end of the gear shift lever, and this guide plate, which is provided to guide the lower end of the gear shift lever when the same is being operated is provided with a notch 19 adapted to receive the lower end of the gear shift lever when the latter is moved to its neutral position, as shown in Fig. 1. Upon the upper end of the gear shift lever 10 is preferably provided a knob 20 adapted to be grasped by the hand to shift the lever.

The structure so far described is old and well known and forms no part of my invention, but as above stated, my invention resides in the mechanism for locking this type of gear shift lever in its neutral position, which I will now describe. The entire gear shift lever 10 is preferably made hollow, as shown, and within the lower portion 11 of this lever is preferably mounted a sliding bolt 21. The lower end of this bolt is preferably made somewhat fork shaped, as indicated by 22 and has a notch 23 formed in the lower face thereof. This fork-shaped member 22 is preferably slidably mounted in a notch 24 formed in the lower end of the gear shift lever, as shown more particularly in Fig. 3, and the notch 23 formed in the member 22 is so positioned that when the gear shift lever is moved to its neutral position with its lower end lying in the notch 19, the sliding bolt 21 may be lowered to bring the lower end of the same into straddling engagement with the guide plate 18, as shown in Figs. 1 and 3, whereupon the gear shift lever will be firmly held in its neutral position. In order to provide key-controlled means for moving the lower end of the bolt 21 into and out of locking engagement with the guide 18, I have provided a cylinder lock 25 preferably mounted in the knob 20 upon the upper end of the lever 10, and in this cylinder lock is mounted a key barrel 26 having an outwardly projecting head 27 positioned to be grasped between the fingers to rotate the key barrel. Within the tubular member 13 of the lever 10 is preferably mounted a relatively long rod 28, the upper end of which is rigidly secured to the key barrel 26 by any preferred means. The lower end of this rod 28 in the embodiment of my invention shown extends into the spherical bearing member 12 and is preferably provided with coarse threads, as indicated by 29. The spherical bearing member 12 of the gear shift lever has a relatively large bore 30 formed therethrough and in this bore is slidably mounted a cylindrical block 31, the lower end of which is rigidly secured to the upper end of the bolt 21 by any preferred means such as a pin 32, and the upper end of this block has a threaded socket 33 formed therein adapted to operatively receive the lower threaded end of the rod 28.

From the mechanism just described, it will be seen that when the key barrel 26 is rotated in one direction, the block 31, due to its threaded engagement with the rod 28, will be raised and the forked bolt 21 will be raised out of straddling engagement with the guide plate 18, as shown in Fig. 2, while when the key barrel 26 is rotated in the opposite direction after the gear shift lever has been moved to its neutral position, the forked bolt 21 will be moved downward into locking engagement with the plate 18 to thereby firmly lock the gear shift lever 10 in its neutral position. The sliding block 31, which is rigidly secured to the bolt 21, is prevented from rotating within the gear shift lever by the fork member 22, which is slidably mounted in the slot 24, so that when the threaded rod 28 is rotated, it is either screwed into or out of the block 31.

From the foregoing description, when read in connection with the drawing, it will be seen that I have provided a very simple and satisfactory means for securing the lower end of a gear shift lever to its guide plate to thereby lock this lever in its neutral position, and it will be apparent that various changes in the construction and the location of the mechanism for moving the notched bolt 21 into locking engagement with the guide plate may be made without departing from the scope of my invention, as defined in the annexed claims.

What I claim is:

1. In combination, a gear shift lever, a bracket in which said lever is movably mounted, a guide mounted in the base of said bracket adjacent the lower end of said lever, a forked member slidably mounted in the lower end of said lever and constructed to straddle said guide, and key-controlled means for moving said forked member into and out of locking engagement with said guide.

2. In combination, a gear shift lever or the like, a bracket member in which an intermediate portion of said lever is fulcrumed, a guide adjacent the lower end of said lever, a notched member carried by the lower end of said lever and movable into straddling engagement with said guide, and key-controlled means for moving said notched member into and out of locking engagement with said guide.

3. In combination, a gear shift lever, a bracket member in which an intermediate portion of said lever is fulcrumed, a guide positioned within said bracket below said fulcrum, said guide having a notch formed therein to receive the lower end of said lever when the same is moved to its neutral position, and key-controlled means within said lever for engaging said guide to lock the lower end of said lever within said notch.

4. In a gear shift lever fulcrumed within a supporting bracket, means for locking said lever rigidly within its bracket, comprising a cylinder lock mounted within said lever with its key barrel extending longitudinally of said lever, a bolt slidably mounted within said lever and movable into locking engagement with a portion of said supporting bracket, and means operable by the rotation of said key barrel for imparting a longitudinal movement to said bolt.

5. In a gear shift lever fulcrumed within a supporting bracket, means for locking said lever rigidly within its bracket, comprising a cylinder lock mounted within said lever with its key barrel extending longitudinally of said lever, a bolt slidably mounted within the lower end of said lever and movable into locking engagement with a portion of said supporting bracket, and means operable by the rotation of said key barrel for imparting a longitudinal movement to said bolt.

6. In combination, a gear shift lever, a bracket in which an intermediate portion of said lever is fulcrumed, a guide adjacent the lower end of said lever, a guide engaging member slidably mounted within said lever, a cylinder lock having a key barrel extending longitudinally of said lever, and means including cooperating threads operable by the rotation of said key barrel for moving said slidable member into and out of locking engagement with said guide.

7. In combination, with a gear shift lever having an intermediate portion fulcrumed in a supporting bracket, a notched guide mounted within the supporting bracket with said notch positioned to receive the lower end of said lever when the same is moved to its neutral position, means for locking said lever in its neutral position, comprising a bolt mounted in the lower end of said lever and movable into locking engagement with said guide, a cylinder lock carried by said lever, a key barrel therein and threaded means operable by the rotation of said key barrel to impart a longitudinal movement to said bolt.

8. The combination with a gear shift lever swingingly mounted within a supporting bracket, a guide within said bracket for the lower end of said lever, said guide having a notch therein positioned to receive the lower end of said lever when the same is in its neutral position, and key operable means carried by said lever and movable into straddling engagement with the sides of said notch to lock the lower end of said lever therein.

9. In combination with a hollow gear shift lever swingingly mounted within a supporting bracket, means for locking said lever to a guide within said bracket, comprising a cylinder lock provided with a key barrel mounted in the upper end of said lever, a guide engaging member slidably mounted in the lower end of said lever, and cooperating threaded means upon said member and key barrel for imparting a longitudinal movement to said guide engaging member by the rotation of said key barrel.

10. In combination, a supporting bracket, a lever pivotally mounted thereon, a guide adjacent said lever, said guide preventing movement of said lever from its normal position in one direction, and key operated means to engage said guide to prevent movement of said lever from normal position in another direction.

11. In combination, a suitably supported lever, an extensible rod non-rotatably associated therewith, said rod extending through the pivot point of said lever and means for extending said rod to project from the end of the lever to lock the same against movement.

12. In combination, a suitably supported lever, an extensible rod non-rotatably associated therewith and having its lower end normally lying within the same, means for extending the rod to project the lower end of the same without lever to lock the latter against movement.

13. In combination, a suitably supported lever, an extensible member non-rotatably mounted within the lever having one end thereof normally projecting from the lever and the other end normally lying within the same, and means for turning the projecting end of the rod to extend the same to project the other end thereof without the lever to lock the latter against movement.

In witness whereof, I have hereunto set my hand on the 15th day of Dec., 1919.

JOSEPH DREXLER.